Dec. 7, 1954 F. H. STIELTJES 2,696,526

BALANCING OF CARRIER CABLES

Filed Feb. 2, 1950

INVENTOR.

Frederik H. Stieltjes

BY

Michael S. Striker agt

United States Patent Office 2,696,526
Patented Dec. 7, 1954

2,696,526

BALANCING OF CARRIER CABLES

Frederik H. Stieltjes, Eindhoven, Netherlands, assignor to International Standard Electric Corporation, New York, N. Y.

Application February 2, 1950, Serial No. 141,899
In the Netherlands September 26, 1940

Section 1, Public Law 690, August 8, 1946
Patent expires September 26, 1960

3 Claims. (Cl. 179—78)

The present invention relates to the balancing of a carrier cable and more particularly to the balancing of a high frequency carrier cable.

This application is a continuation-in-part of my application Serial No.766,708, filed August 6, 1947, for Method of Balancing a Carrier Cable and Cable Balanced According to This Method.

It has been discovered that the known methods for correcting the near-end and the far-end cross talk in a cable having several conductors are inadequate when the frequency of the signals exceeds 40 kc. per sec. Beyond this value effects to be called hereinafter asymmetrical far-end cross-talk disturb the transmission which at lower frequencies are too small for interfering with the transmission.

Figure 1:
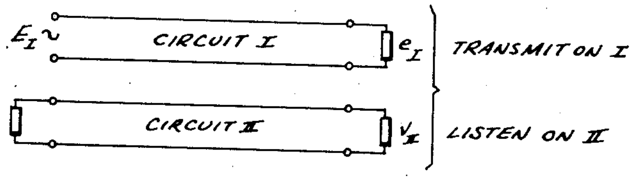
Figure 2:
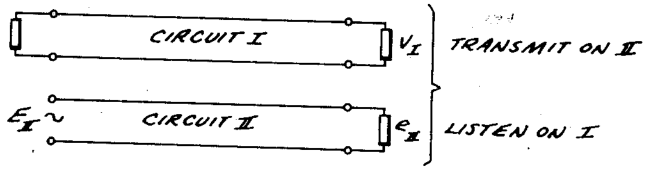
Figure 3A:
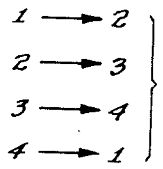
Figure 3B:
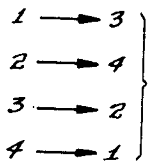
Figure 4:
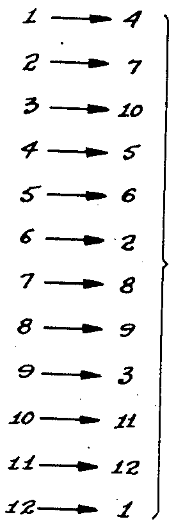
Figure 5:
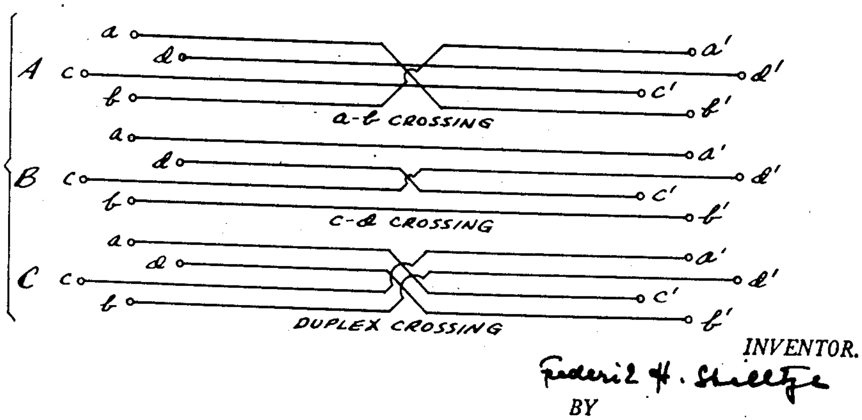

The invention will be more fully understood from the following detailed description with reference to the accompanying drawings in which Figs. 1 and 2 are circuit diagrams of a transmitting circuit and a receiving circuit respectively;

Figs. 3A and B illustrate two embodiments of the invention applied to a cable having four groups of conductors;

Fig. 4 illustrates an embodiment of the invention applied to a cable having twelve groups of conductors; and Fig. 5 shows crossings between the pairs of a star-group cable which can be used in addition to one of the embodiments shown in Figs. 3A and 3B.

Referring now to the drawings and first to the diagrams shown in Figs. 1 and 2, each diagram comprises two circuits I and II. In the diagram according to Fig. 1, circuit I is the transmission circuit which is supplied with a signal voltage $E_I$ which causes a voltage $e_I$ at an impedance terminating the far-end of circuit I. Circuit II is terminated at both ends by impedances, a voltage $v_{II}$ appearing on the far-end impedance when circuit I is fed with the voltage $E_I$ as shown. The reduced far-end cross-talk ratio is defined by $$t_{I,\,II}=\frac{v_{II}}{e_I}$$

Conversely circuit II may be the transmission circuit and circuit I the listening circuit as shown in Figure 2 in which a signal voltage $E_{II}$ is supplied to circuit II where it produces a voltage $e_{II}$ across an impedance arranged at the far-end and induces voltages in circuit I which is terminated by proper impedances on both ends, the induced voltage at the far-end being $v_I$. The reduced far-end cross-talk ratio is defined by $$t_{II,\,I}=\frac{v_I}{e_{II}}$$

These two far-end cross-talk ratios not necessarily equal. If they are unequal the far-end cross-talk is said to be asymmetrical, in which case $$t_{I,\,II}\neq t_{II,\,I}$$

If the far-end cross-talk is symmetrical, $$t_{I,\,II}=t_{II,\,I}$$

If the far-end cross-talk is asymmetrical,it can be considered as consisting of two components, a symmetrical component $t_s$ and an alternating or anti-symmetrical component $t_a$ so that $$t_{I,\,II}=t_s+t_a$$

and $$t_{II,\,I}=t_s+t_a$$

In practice the cross-talk ratios are measured in decibels so that $$b_{I,\,II}=-20\log|t_{I,\,II}|$$

and $$b_{II,\,I}=-20\log|t_{II,\,I}|$$

The known balancing methods which aim at the suppression of the symmetrical far-end cross-talk allow only one of the far-end cross-talk ratios to be improved for instance that for transmission on circuit I and listen ing on circuit II. When a cable is balanced according to the known balancing methods the other far-end cross-talk ratio (for instance that for transmission on circuit II and listening on circuit I) may become worse than it was before the balancing was carried out.

The following summarizes some of the causes of the far-end cross-talk between two circuits:

(a) A first cause consists in capacitive, magnetic and resistance couplings between the two circuits which cause normal near-end and far-end cross-talk;

(b) A second cause consists in the coupling of the two circuits with one or more third circuits. Such couplings cause a transmission of energy from the disturbing circuit to the third circuit which in turn acts as a disturbing circuit on the other, the disturbed circuit. Thus an indirect far-end cross-talk is caused between the disturbing circuit and the disturbed circuit.

If the disturbing and disturbed circuits are equal to each other they have the same transmission properties. If also the couplings mentioned under (a) are predominating over those under (b), only a direct symmetrical far-end cross-talk exists between the two circuits which can be easily balanced by known methods. Since both circuits have the same transmission properties the disturbing voltage in one circuit and the far-end cross-talk voltage in the other circuit are subject to the same modifications during their propagation over the circuits. Thus it is irrelevant where the coupling between the two circuits is arranged so that the far-end cross-talk voltage can be reduced by a suitable counter-coupling between the two circuits which may be arranged anywhere.

However, neither the near-end cross-talk caused by direct couplings between the two circuits nor the indirect far-end cross-talk has the property that the disturbing voltage in the disturbing circuit and the disturbed voltage in the disturbed circuit are subject to the same modifications. This fact is probably the reason for the fact mentioned hereabove that at a frequency exceeding 40 kc. per sec. an asymmetrical far-end cross-talk becomes troublesome which is negligible at low frequencies and cannot be easily balanced.

I have found however, that unexpectedly at these high frequencies the group transmission properties are unequal, so that an asymmetrical far-end cross-talk appears, the character of which is systematic, for instance proportional to the square of frequency, and my invention allows to balance this asymmetrical far-end cross-talk.

In reducing the asymmetrical far-end cross-talk according to this invention, the following should be taken into consideration:

(a) Care should be taken that a particular near-end cross-talk does not for some reason or other become troublesome and is converted into a far-end cross-talk.

(b) The indirect far-end cross-talk should be so small in comparison to the direct far-end cross-talk that it can be neglected with respect to the latter.

With respect to (a), it is remarked that a near-end cross-talk is converted to a far-end cross-talk in reflections in the circuits come into play. This is a reason why the circuits should be properly terminated which especially holds good for the reception side of the disturbing circuit and for the transmission side of the disturbed circuit. Also a non-homogeneity of the two circuits causing internal reflections is to be taken into consideration here. This effect, however, does not become troublesome as long as the frequency does not exceed 200 kc. per sec.

The present invention relates particularly to the reduction of the asymmetrical far-end cross-talk connected with normal coupling. It has been found that this far-end cross-talk arises when considerable differences in phase rotation between the pairs of conductors exist. These differences come into play at high frequencies even when the relative differences in phase propagation constants are small. As a matter of fact the magnitude of the total absolute phase differences is remarkably great at high frequencies because of the very great value of the total absolute phase rotations.

The present invention provides a remedy against these differences and consists in systematically changing the conductors of the cable sections where they are spliced together.

Figs. 3A and 3B show diagrammatically the systematical exchange of the groups of a four-group cable. In each of these figures the left-hand side denotes by the numerals 1, 2, 3, 4 the groups in one section of the cable whereas the same numerals on the right-hand side denote the corresponding groups of conductors in a next adjacent section of the cable. According to Fig. 3A, the groups of conductors in successive sections are cyclically exchanged, that is, group of conductors 1 in section 1 is connected to group of conductors 2 in section 2, group of conductors 2 in section 1 to group of conductors 3 in section 2, group of conductors 3 in section 1 to group of conductors 4 in section 2, and group of conductors 4 in section 1 to group of conductors 1 in section 2.

In Fig. 3B group of conductors 1 in section 1 is connected to group of conductors 3 in section 2, group of conductors 2 in section 1 to group of conductors 4 in section 2, group of conductors 3 in section 1 to group of conductors 2 in section 2, and group of conductors 4 in section 1 to group of conductors 1 in section 2.

It will be understood that each junction of successive sections an exchange of groups of conductors is carried out so that each group of conductors will occupy all spatial positions in the cable if the number of sections exceeds four.

If desired, the exchange of groups of conductors may be combined with the connection of conductors as shown in Fig. 5, A, B, C. The method according to these figures is fully described in my copending application Serial No. 766,708 filed August 6, 1947, now abandoned for Cable Balance, a reference to which is made for a full disclosure. The combination is made in applying at one junction a systematical exchange of groups of conductors as shown in Fig. 3A or 3B and at the next following junction a crossing as shown in any of Figs. 5A to C. At the following junction again an exchange of groups of conductors according to Figs. 3A or 3B is applied which is followed by a crossing of conductors at the next junction according to any of Figs. 5A to C, etc.

If desired, some sections may be joined at first without applying the present invention. These joints are intended to be used after the establishment of the other joints as testing places for finding the most favorable crossings.

Referring now to Fig. 4 of the drawings, a method of exchanging the groups of conductors of two sections of a twelve-conductor cable is shown. The groups of conductors 1 to 12 of the first section represented on the left-hand side of Fig. 4 are connected to the groups of conductors of the second section of the cable represented on the right-hand side of Fig. 4 in such a way that no crossings of pairs of conductors in the group occur. In the embodiment shown in the drawing group of conductors 1 of section 1 is connected to group of conductors

4 of section 2, group of conductors 2 of section 1 to group of conductors 7 of section 2, etc. Of course, a great number of different methods of exchanging the groups of conductors of a twelve group cable can be derived, for instance, a cyclic exchange of groups of conductors which will be apparent to any person skilled in the art. It should be understood that at each junction of consecutive sections an exchange of groups of conductors is applied so that with a sufficient number of sections each group of conductors assumes every possible spatial relation in the cable.

By the exchange of groups of conductors according to the present invention the differences in phase rotation between the circuits are kept within allowable maximum limit, and therefore the asymmetrical far-end cross-talk mentioned hereinabove is effectively reduced.

It will be understood that each of the elements described above, or two or more together, may also find a useful application in other types of carrier cables differing from the types described above.

While I have illustrated and described the invention as embodied in carrier cable for transmitting high frequency signals, I do not intend to be limited to the details shown, since various modifications and structural changes may be made without departing in any way from the spirit of my invention.

What I claim as new and desire to secure by Letters Patent is:

1. A method of balancing a high frequency carrier cable having a plurality of sections each having a plurality of conductors, comprising the step of systematically exchanging groups of conductors at alternate section junctions and transposing pairs of a group of said conductors with each other at adjacent section junctions.

2. A high frequency carrier cable having sections each having a plurality of conductors forming star groups, comprising in combination, first connections between the conductors of a first section and the conductors of a second section, said first connections systematically exchanging the groups of conductors of said first and second sections; and second connections between the conductors of the second section and a third section, said second connections establishing transpositions between the pairs of conductors forming the star groups, the junction between the third and a fourth section being analogous to that between the first and the second sections.

3. A high frequency carrier cable having sections each having a plurality of conductors forming star groups, comprising in combination, first connections between the conductors of a first section and the conductors of a second section, said first connections systematically exchanging the groups of conductors of said first and second sections; and second connections between the conductors of the second section and a third section, said second connections consisting in transposing one pair of the group of conductors, the other pair being connected straight through, the junction between the third and the fourth section being analogous to that of the first and second sections.

References Cited in the file of this patent

UNITED STATES PATENTS

| Number | Name | Date |
|---|---|---|
| 1,792,273 | Byk et al. | Feb. 10, 1931 |
| 1,799,188 | Weaver | Apr. 7, 1931 |
| 1,915,442 | Nyquist | June 27, 1933 |
| 1,922,138 | Nyquist | Aug. 15, 1933 |
| 2,167,016 | Weaver | July 25, 1939 |
| 2,373,906 | Mouradian | Apr. 17, 1945 |